Patented July 23, 1929.

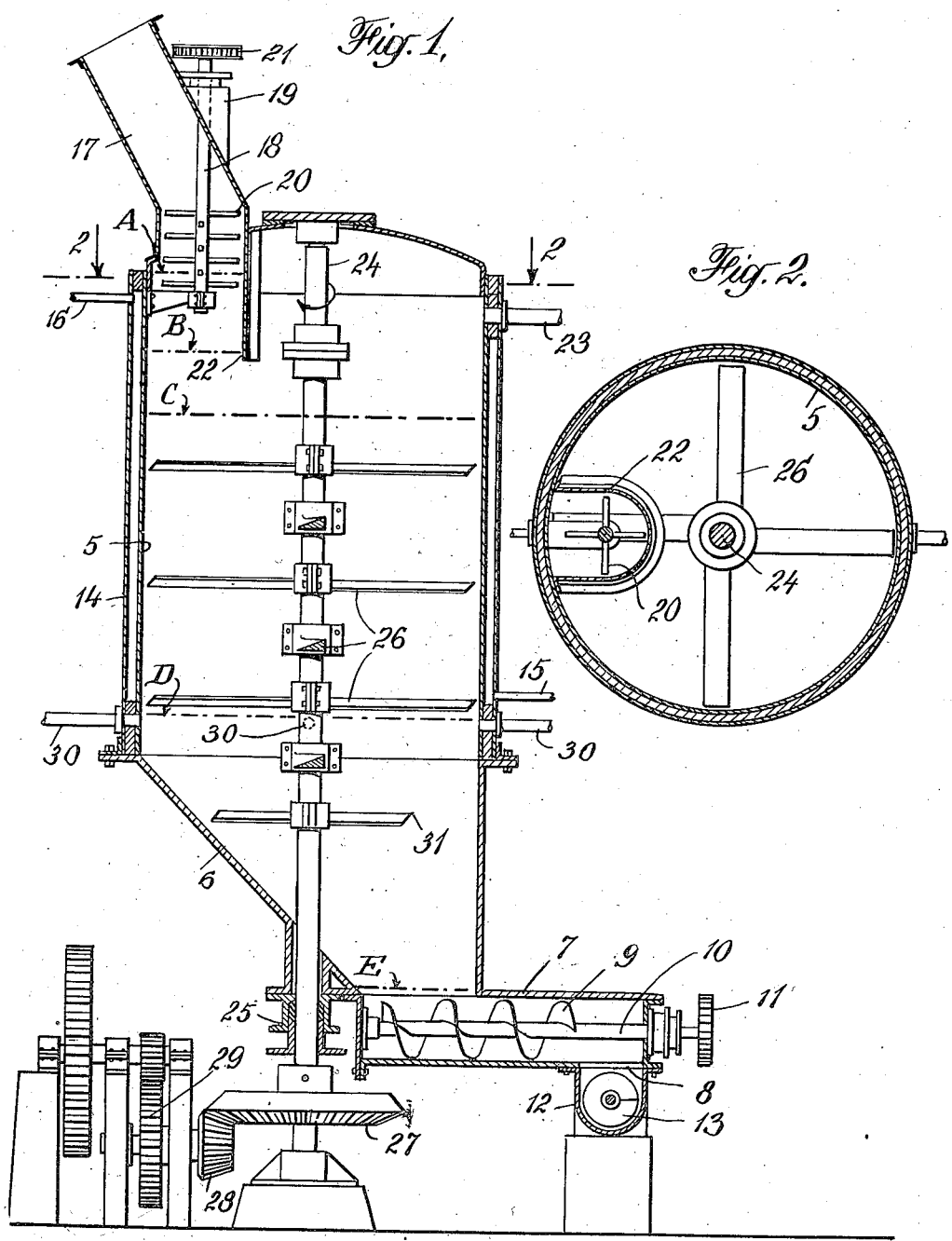

1,721,858

UNITED STATES PATENT OFFICE.

CLARENCE F. EDDY, OF NORFOLK, VIRGINIA, ASSIGNOR, TO PROSCO OILS CORPORATION, OF NORFOLK, VIRGINIA, A CORPORATION OF DELAWARE.

EXTRACTION.

Application filed July 21, 1927. Serial No. 207,340.

This invention relates to extraction, and particularly to the recovery of fats and oils from oleaginous materials.

The extraction of oleaginous materials involves considerable difficulty owing to the nature of the material which tends to prevent complete penetration by the solvent and especially because of the impossibility of separating the finer particles of the solid material from the solvent after the extraction is completed. Attempts have been made heretofore to extract such materials by agitation with a solvent followed by filtration, but such operations are relatively slow because the thickness of the filter bed for economical operation is limited. This thickness may range from a few inches to a few feet depending upon the nature and degree of fineness of the material. Separation by decantation has also been employed but it does not usually permit the separation of a clear solution. Both filtration and decantation as usually conducted are batch operations and the capacity of a plant of given size is, therefore, restricted.

It is the object of the present invention to combine the advantages of filtration and decantation in a single and continuous counter-current extraction operation and thus to avoid the difficulties heretofore experienced and to provide a method and apparatus whereby extraction of oleaginous and like materials may be conducted more economically.

In carrying out the invention the material to be extracted is subjected in a number of successive zones to operations which ensure, first, the displacement of air from the solid material; second, penetration of the material by the solvent; third, the maximum washing of the material with the solvent; and finally the removal of the major portion of the solvent from the extracted solids. The movement of the material through the successive zones is effected by gravity and the solvent is caused by displacement to travel in a counter-current direction so that it can be removed continuously from the surface, thus carrying away the extracted fats or oils. The extracted solid material is likewise removed continuously from the bottom of the extractor with the minimum amount of solvent which may be removed subsequently by any suitable drying operation.

In the initial zone of extraction the solid material to be extracted is introduced beneath the surface of the extracting solution to a relatively quiescent zone. The body of solid material entering the extractor acts as a seal to prevent the escape of vapors. During its relatively slow movement into the solution the air is displaced and consequently the material which may be relatively porous is brought into a condition in which it will readily absorb the solvent.

In the second or quiescent zone the material is saturated with the solvent and it serves, moreover, as a filter bed through which the solution rises. The relatively coarser particles trap the fines and prevent escape thereof to the top of the extractor where the supernatant liquid is decanted in a substantially clear condition free from fines and other particles of the material being extracted.

In the third zone the material is subjected to gentle agitation with arms which cut a path through the dense mass of descending solids allowing the solvent to ascend in a generally spiral direction and avoiding travel of the solvent in a substantially straight path.

This ensures substantially complete extraction and thorough washing of the material with the solvent. The latter is introduced near the bottom of this zone and is caused to flow upwardly by displacement through the overlying mass of material, being subjected to gentle agitation for the purpose of washing the solid material and passing then through the quiescent zone where the entrained fine particles are filtered by the mass of descending solid material. It escapes finally from the top of the extractor and carries away the extracted fats and oils. The amount of solvent and the rate at which it is introduced can be regulated to accomplish the substantially complete extraction of the material. The temperature at which the extraction is conducted can be regulated also in accordance with the nature of the solvent and of the material being extracted to ensure maximum extraction of the fats and oils.

After extraction the material passes by gravity into the final zone of the extractor where it is again quiescent. In this zone, which may be called the "zone of compression", the weight of the solid material displaces the liquid, thus forcing upwardly the major portion of the solvent. The solid material which is freed substantially from solvent is withdrawn from the bottom of the extractor by suitable means and is discharged into a convenient distilling apparatus wherein it is heated for the purpose of removing and recovering the balance of the solvent. The distilling apparatus forms no part of the present invention and it is an important feature of the extractor that the temperature therein can be maintained substantially constant since no attempt is made to remove solvent therein from the solid material by raising the temperature at intervals as has been the practice in other extraction operations.

Among the advantages of the invention are continuous operation under uniform conditions permitting standardization, better control and less labor. The operation permits the recovery of a solution containing a maximum uniform concentration of fats and oils, thus reducing the cost of distilling dilute solutions and the possible injury of the product by prolonged heating. The operation is, therefore, more efficient and it is particularly economical by reason of the fact that it can be conducted continuously with the minimum degree of attention and periodical modification of the procedure.

The operation as described can be carried out in various forms of apparatus but it will be described more particularly with reference to the apparatus illustrated in the accompanying drawing, in which Fig. 1 is a vertical section through the apparatus; and Fig. 2 is a transverse section on the line 2—2 of Fig. 1.

Referring to the drawing, the extractor comprises a shell 5 preferably cylindrical in form having a sloping bottom 6 terminating in a trough 7 having an outlet 8. A worm 9 is disposed in the trough and is adapted to be driven through a shaft 10 and gear 11 from any suitable source of power. Since the nature of the material may vary provision should be made for operating the worm 9 at various speeds to permit the withdrawal of the solid material at a regulated rate. The material may be discharged into a trough 12 having a worm 13 therein which conveys the solid material, for example, to a distilling apparatus (not shown) wherein the solvent is removed by the application of heat.

The shell 5 is closed at the top and is surrounded by a jacket 14 through which any suitable heating or cooling medium may be circulated for the purpose of maintaining the desired temperature within the extractor. The heating or cooling medium, for example, steam or water, can be introduced through a pipe 15 and withdrawn through a pipe 16.

The material to be extracted is introduced through a chute 17 at the top of the extractor from any source such as a bin. The chute is sufficiently long to permit the maintenance of a body of the solid material therein so that the latter will act as a seal. A shaft 18 is supported in a bearing 19 and carries a plurality of arms 20. The shaft may be driven through a gear 21 from any suitable source of power, the arms 20 being rotated thus for the purpose of moving the solid material downwardly into the extractor. A baffle 22 depends from the top of the extractor and extends across the same to provide in effect an extension of the chute 17. The lower edge of the baffle is below the upper level of the solvent in the extractor. The solid material is thus introduced to the extractor below the level of the liquid therein. Saturation of the solid material is thus effected and escape thereof to the outlet 23 through which the liquid is decanted is avoided.

A shaft 24 is supported in a stuffing box 25 and carries a plurality of arms 26 in spaced relation in the intermediate zone of the extractor. The shaft is driven through a bevel gear 27, pinion 28 and reducing gear 29 from any suitable source of power. The shaft is rotated so that the arms 26 cause a gentle agitation of the solid and liquid material and thus cause maximum washing and extraction of the solid material as it descends through the extractor. The rate of rotation of the shaft 24 may be varied in accordance with the nature of the material undergoing extraction so as to accomplish the purpose of the invention.

As hereinbefore indicated, the material entering the extractor passes through a succession of zones. In the zone AB the material is forced beneath the level of the liquid, being freed from air therein and partially saturated with the solvent. It enters the zone BC which is relatively quiescent and in this zone the material becomes fully saturated. It acts therein as a filter bed to remove fines from the rising solvent which, after passing through the quiescent layer, is decanted through the outlet 23. The zone BC should be approximately a foot or more in depth to insure complete saturation of the solid material before it enters the agitating zone CD wherein it is agitated gently by means of the arms 26 which cut a path for the solvent through the dense mass of descending solids. In this zone substantially complete extraction and washing are accomplished. The solid material tends to descend constantly by gravity and displaces the solvent which consequently rises through the overlying zone in which it is filtered and from which it escapes as a clear liquid which can be decanted as hereinbefore indicated.

The solvent is introduced at the bottom of the zone CD through a plurality of inlets 30 which distribute it so as to ensure the application of the fresh solvent to all of the descending solid material. The solvent rises as hereinbefore indicated and thus comes into contact as the result of agitation with all of the descending material.

The solid material continues to descend through the zone DE in which it is concentrated by displacement of the solvent and also by compression due to the weight of the overlying solid material. The compression causes separation of the major portion of the solvent which rises through the separator and joins the solvent which is introduced through the several inlets. An arm 31 on the shaft 24 at the top of the compression zone prevents agglomeration of the solid material at this point and permits the liquid to rise constantly as it is displaced. The solid material from which the major portion of the solvent has been displaced is finally removed by the worm 9 in the manner hereinbefore described.

As an example of the application of the invention, it can be used for the extraction of cocoa powder with solvents such as benzol. Cocoa powder may contain approximately 20% of fat content. It has been extracted in an apparatus such as that described to a fat content of less than one per cent. at the rate of 20 tons in 24 hours. The apparatus was 6 feet in diameter, 8 feet in the straight, and 4 feet in the cone. In this apparatus more than 2 hours were required for the material to pass through the extraction zone so that there was ample time for the substantially complete extraction indicated. The apparatus has been used in extracting grades of cocoa powder which gave considerable trouble because of porosity. With apparatus heretofore available skilled operators had great difficulty in reducing the fat content of the material below 1.75%. By the use of the invention as described the fat content was easily reduced to 0.8%.

The following are examples of the practical application of the invention:

```
Material being extracted__ Cocoa cake    Soya beans
Physical state of solids___ Powder        Thin flakes
Oil content entering ext___ About 17%     About 15%
Solvent used_____ Benzol         Gasoline
Specific gravity of solvent_ .876          .71
Ratio of wt. of solvent to
  chg_____4.0             3.4
Temperature of extraction_ About 100 F.   About 80 F.
Solvent in discharge from
  extractor_____Less than 50%  Less than 40%
Oil in spent solids (dry
  basis)_____Less than 1%  Less than 1%
```

The invention includes the advantages of continuous counter-current extraction and temperature control with continuous clarification of the solution by filtration and decantation. These and other advantages may be attained by the practice of the invention as described, and various changes may be made therein and in the apparatus employed without departing from the invention or sacrificing such advantages. While the invention has been particularly described with reference to the extraction of fats and oils from oleaginous materials, it is to be understood that the invention is not limited to the extraction of these materials but may be carried out in processes involving the extraction of various other types of materials.

I claim:—

1. The method of extracting materials, which comprises causing a solvent to flow upwardly by displacement through a zone in which the solvent is agitated with the material to be extracted and through a second zone where it is permitted to become relatively quiescent, the material in the latter zone acting as a filter for the solvent.

2. The method of extracting materials, which comprises causing a solvent to flow upwardly by displacement through a zone in which the solvent is agitated with the material to be extracted and through a second zone where it is permitted to become relatively quiescent, the material in the latter zone acting as a filter for the solvent, and continuously withdrawing the supernatant layer of solvent.

3. The method of extracting materials, which comprises causing a solvent to flow upwardly by displacement through a zone in which the solvent is agitated with the material to be extracted and through a second zone where it is permitted to become relatively quiescent, the material in the later zone acting as a filter for the solvent, and continuously feeding material to be extracted to the quiescent zone.

4. The method of extracting materials, which comprises causing a solvent to flow upwardly by displacement through a zone in which the solvent is agitated with the material to be extracted and through a second zone where it is permitted to become relatively quiescent, the material in the latter zone acting as a filter for the solvent, continuously feeding material to be extracted to the quiescent zone and continuously withdrawing the supernatant layer of solvent.

5. The method of extracting materials, which comprises causing a solvent to flow upwardly by displacement through a zone in which the solvent is agitated with the material to be extracted and through a second zone where it is permitted to become relatively quiescent, the material in the latter zone acting as a filter for the solvent, and concentrating the material by compression due to the weight of the overlying solid material, thereby displacing solvent from around and within the material.

6. The method of extracting materials, which comprises causing a solvent to flow upwardly by displacement through a zone in which the solvent is agitated with the material to be extracted and through a second zone where it is permitted to become relatively quiescent, the material in the latter zone acting as a filter for the solvent, continuously feeding material to be extracted to the quiescent zone, continuously withdrawing the supernatant layer of solvent and concentrating the material by compression due to the weight of the overlying solid material, thereby displacing solvent from around and within the material.

7. In an extraction apparatus, a shell, an inlet in one end of the shell for the material to be extracted, a solvent inlet and a solvent outlet for said shell, the solvent inlet being adjacent the end remote from the material inlet and the solvent outlet being adjacent the end having the material inlet, whereby continuous countercurrent contact may be maintained between the material and the solvent, means for effecting agitation of the material with the solvent in a zone below the top of the material without causing any substantial agitation of the top material which remains relatively quiescent, said solvent outlet being above the quiescent top material.

8. In an extraction apparatus, a shell, a solvent inlet adjacent one end of the shell, a solvent outlet adjacent the other end of the shell, means for introducing material into said shell below the level of the solvent outlet, and means for effecting agitation of the material with the solvent in a zone below the top of the material without causing any substantial agitation of the top material which remains relatively quiescent.

9. In an extraction apparatus, a shell, a solvent inlet adjacent one end of the shell, a solvent outlet adjacent the other end of the shell, means for introducing material into said shell below the level of the solvent outlet, and means for effecting agitation of the material with the solvent in a zone below the top of the material without causing any substantial agitation of the top material which remains relatively quiescent, said solvent outlet being above the quiescent top material.

10. In an extraction apparatus, a shell, a solvent inlet adjacent one end of the shell, a solvent outlet adjacent the other end of the shell, means for introducing material into said shell below the level of the solvent outlet, means for effecting agitation of the material with the solvent in a zone below the top of the material without causing any substantial agitation of the top material which remains relatively quiescent, said solvent outlet being above the quiescent top material, and means for withdrawing the material after extraction from the bottom of the shell.

11. The method of extracting materials, which comprises causing a solvent to flow upwardly by displacement throughout a zone in which the solvent is agitated with the material to be extracted and through a second zone where it is permitted to become relatively quiescent, the material in the latter zone acting as a filter for the solvent, continuously withdrawing the supernatant layer of solvent, and concentrating the material by compression due to the weight of the overlying solid material, thereby displacing solvent from around and within the material.

12. The method of extracting materials, which comprises causing a solvent to flow upwardly by displacement through a zone in which the solvent is agitated with the material to be extracted and through a second zone where it is permitted to become relatively quiescent, the material in the latter zone acting as a filter for the solvent, continuously feeding material to be extracted to the quiescent zone, continuously withdrawing the supernatant layer of solvent, and concentrating the material by compression due to the weight of the overlying solid material, thereby displacing solvent from around and within the material.

In testimony whereof I affix my signature.

CLARENCE F. EDDY.